US012201118B2

(12) United States Patent
Gulak et al.

(10) Patent No.: US 12,201,118 B2
(45) Date of Patent: Jan. 21, 2025

(54) APPARATUS AND METHOD FOR SEPARATING MEAT FROM BONE

(71) Applicant: POSS DESIGN LIMITED, Oakville (CA)

(72) Inventors: Kenneth Benjamin Gulak, Oakville (CA); Neil Metcalfe, Oakville (CA)

(73) Assignee: POSS DESIGN LIMITED, Ontario (CA)

( * ) Notice: Subject to any disclaimer, the term of this patent is extended or adjusted under 35 U.S.C. 154(b) by 0 days.

(21) Appl. No.: 18/414,381

(22) Filed: Jan. 16, 2024

(65) Prior Publication Data

US 2024/0237659 A1    Jul. 18, 2024

Related U.S. Application Data

(60) Provisional application No. 63/480,390, filed on Jan. 18, 2023.

(51) Int. Cl.
*A22C 17/00* (2006.01)

(52) U.S. Cl.
CPC .................. *A22C 17/004* (2013.01)

(58) Field of Classification Search
CPC .................................................. A22C 17/004
USPC ......................................................... 452/135
See application file for complete search history.

(56) References Cited

U.S. PATENT DOCUMENTS

| 3,741,772 A * | 6/1973 | McFarland ............ A22C 17/04 |
| | | 426/480 |
| 4,041,572 A | 8/1977 | Martin et al. |
| 4,042,176 A | 8/1977 | Beck |

(Continued)

FOREIGN PATENT DOCUMENTS

| EP | 0627168 A1 | 5/1994 |
| EP | 2783572 A1 | 10/2014 |

(Continued)

OTHER PUBLICATIONS

Provisur Technologies; Separation Bone Cannon—"Advanced Meat Recovery System".

(Continued)

*Primary Examiner* — Richard T Price, Jr.
(74) *Attorney, Agent, or Firm* — Tarolli, Sundheim, Covell & Tummino LLP

(57) ABSTRACT

An apparatus and method for separating meat from bone. Meat-laden bones are fed to a compression screw rotating within a barrel. The compression screw and the barrel cooperate to progressively compress the meat-laden bones to force the meat-laden bones radially outward against an inner wall of the barrel as the meat-laden bones move axially along the compression screw. At least a portion of the meat is separated from the meat-laden bones by forcing the meat through apertures in the barrel while inhibiting the meat-laden bones from co-rotating along within the barrel with the compression screw. In one embodiment, inhibiting the meat-laden bones from co-rotating within the barrel along with the compression screw is accomplished by cooperation of guide channels extending axially along an inner surface of the barrel with curved fillets extending between a root of the compression screw and screw flights of the compression screw.

18 Claims, 14 Drawing Sheets

(56) References Cited

U.S. PATENT DOCUMENTS

| | | | |
|---|---|---|---|
| RE32,060 E | * | 12/1985 | McFarland ............ A22C 17/04 426/480 |
| 5,160,290 A | | 11/1992 | Richburg |
| 5,580,305 A | * | 12/1996 | McFarland ........... B02C 18/301 241/74 |
| 5,813,905 A | | 9/1998 | Boeijen et al. |
| 8,882,571 B2 | | 11/2014 | Hazenbroek et al. |
| 9,107,426 B2 | * | 8/2015 | Eisiminger ........ A22C 21/0069 |
| 10,888,872 B2 | | 1/2021 | Rochedreux |
| 2010/0087129 A1 | | 4/2010 | Gulak |
| 2012/0178350 A1 | * | 7/2012 | McFarland ............ A22C 17/04 452/138 |

FOREIGN PATENT DOCUMENTS

| | | |
|---|---|---|
| JP | 2019-136003 A | 8/2019 |
| WO | 88/04893 A1 | 7/1988 |
| WO | 94/06302 A1 | 3/1994 |
| WO | 1998/04141 A1 | 2/1998 |
| WO | 2011/0193701 A1 | 8/2011 |
| WO | 2015/005792 A1 | 1/2015 |

OTHER PUBLICATIONS

Youtube; ProTEN Prok Bones—High Capacity Meat Harvesting; Meat Market; VIDEO; https://marel.com/products-solutions/ . . . ; Apr. 11, 2024; 2 pgs.

Youtube: ProFIVE Meat Harvester for Park | Marel; Video; https://marel.com/en/products/profive/pig-pork/, Apr. 11, 2024; 6 pgs.

Youtube: Meat Harvesting Systems for the Food Industry | Marel; Video; https://marel.com/en/meat/pig-pork/secondary-processing/meat-harvesting/; Apr. 11, 2024; 4 pgs.

Youtube: Meat Harvester DMM | Marel; Video; https://marel.com/en/products/meat-harvester-dmm/pig-pork/; 6 pgs.

Provisur Technologies; Youtube: Bone Cannon® Meat Separator | Pre-Sizer; Video; Apr. 11, 2024; https://www.youtube.com/watch?v=rtDJJ2hxqK0; 2 pgs.

Provisur Technologies; Recover More Raw Material and Boost Profits with the Bone Cannon; Youtube Video; Bone Cannon Hydrau Press Separator; https://www.provisur.com/en/equipment/separation/bone-cannon-hydrau-separator/; Apr. 11, 2024; 3 pgs.

Youtube; Automated Conveyor Systems UK Designed at C-Trak Ltd Oct. 2020; Video; https://www.youtube.com/watch?v=mvE8k68s0i4; 2 pgs.

Youtube: ProTEN—Advancedmeat harvesting of pork with an unprecedented capacity; https://marel.com/en/products/proten/pig-pork/; Apr. 11, 2024; 5 pgs.

Applicant: Poss Design Limited; "Apparatus and method for Separating Meat from Bone"; European Application No. 24152737; Extended European Search Report; Examiner: Rob Postma; Dated Mailed: Jun. 20, 2024; 11 pgs.

* cited by examiner

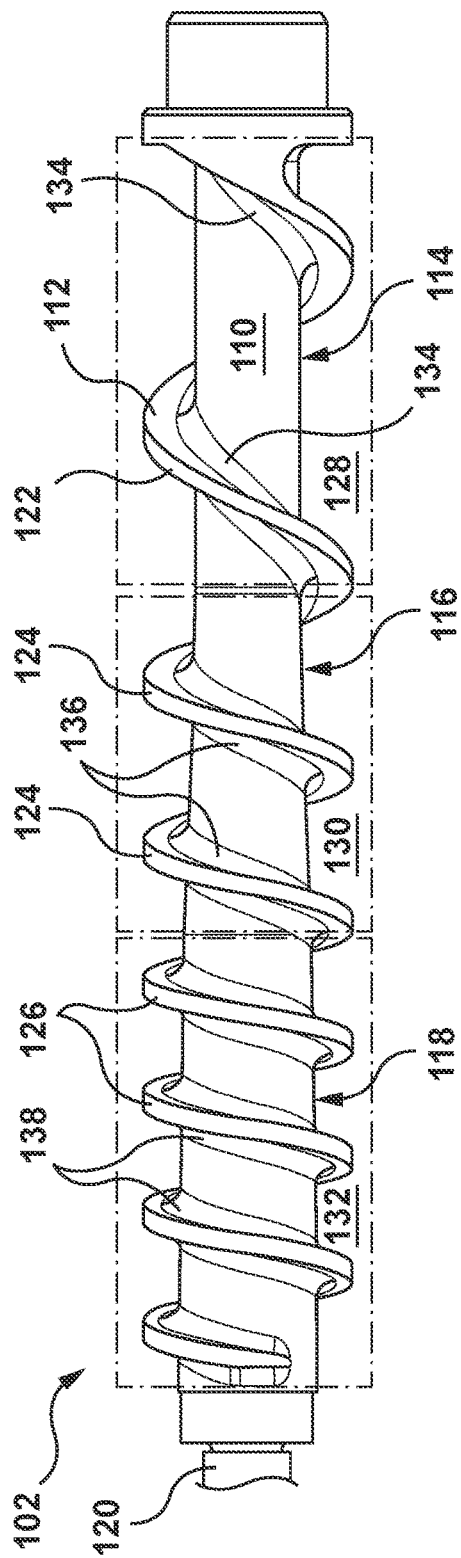
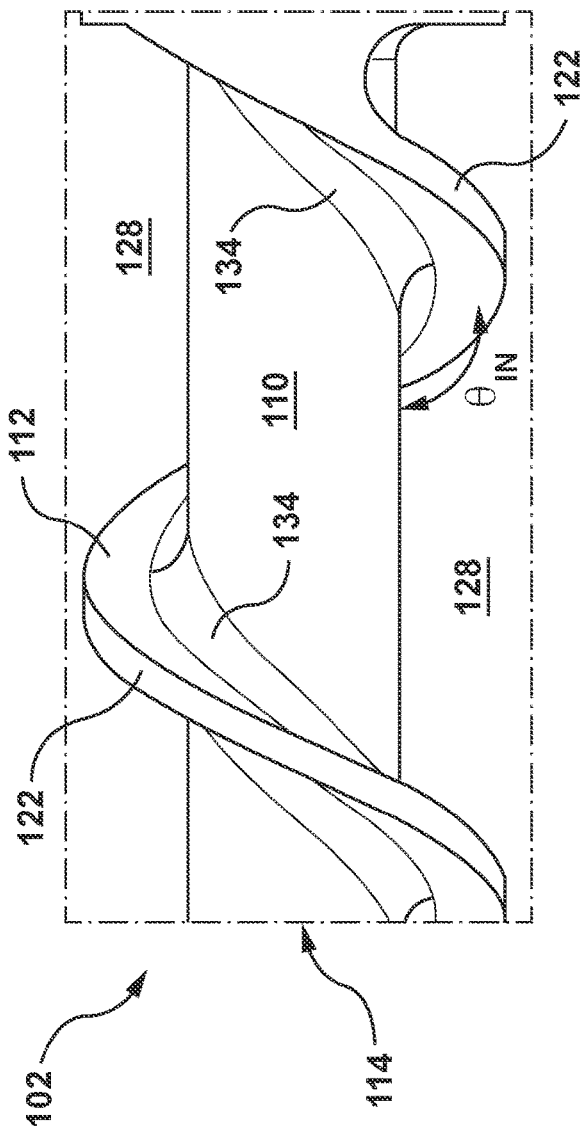
FIG. 7
FIG. 7A

APPARATUS AND METHOD FOR SEPARATING MEAT FROM BONE

CROSS-REFERENCE TO RELATED APPLICATION

This application claim priority to U.S. Provisional Application No. 63/480,390 filed on Jan. 18, 2023, the teachings of which are hereby incorporated by reference.

TECHNICAL FIELD

The present disclosure relates to relates to meat processing, and more particularly to machines used to separate meat from bone matter.

BACKGROUND

Meat processing operations often produce, as a by-product, bones having small amounts of meat attached. While the amount of meat attached to any individual bone may be relatively small, in large meat processing operations the overall amount of meat that remains attached to the bones can be significant. Accordingly, it is desirable to recover this meat.

The process of reclaiming meat attached to leftover bones involves mechanically separating skeletal muscle tissue from the bones of livestock, and is referred to as "advanced meat/bone separation" or more generally "advanced meat recovery" or "AMR". One concern associated with advanced meat recovery is that the separation process can shear off small pieces of bone. Even if there are no bone fragments large enough to pose a direct safety risk, incorporation of significant amounts of bone matter into the reclaimed meat can result in unacceptably high levels of certain chemicals contained in the bones, such as calcium.

For certain types of meat, a multi-stage meat recovery process may be used. In the first stage, a linear press separator is used. In a linear press separator, a chamber is loaded with meat-laden bones. The term "meat-laden bones" includes both intact whole bones and bone pieces smaller than a whole bone, where the bones and/or bone pieces carry muscle tissue (meat) and may also carry other soft tissue. Once the chamber is loaded, a piston forces the meat-laden bones into a perforated drum to expel meat through the perforations and eject a cylinder of compressed bone pieces (sometimes referred to as a "bone puck"). Examples of this type of separator include the separators offered under the brand BONE CANNON® by Provisur Technologies, Inc. After this first stage, the expelled meat will typically contain higher levels of bone matter than is acceptable for a food product, so the expelled meat proceeds to a second stage, in which further separation is carried out. The second stage is typically a compression screw separator, in which the expelled meat is fed into a barrel within which a rotating compression screw compresses the meat as it moves axially along the barrel and forces the meat outwardly against a suitably sized perforated screen. Meat is expelled through the perforations, while larger bone fragments are unable to pass through the perforations and are pushed out the end of the barrel. Examples of compression screw separators include the POSS™ ProMax™ line of separators offered by Poss Design Limited.

One disadvantage of linear press separators is that they often require the use of a "pre-breaker" or "pre-sizer" before the first stage. A pre-sizer forces meat-laden bones through a cutting grid to produce meat-laden bones with bone pieces no larger than a maximum size defined by the cells of the cutting grid. This is a source of bone breakage, which is disadvantageous.

More significantly, linear press separators are cyclical in operation; the piston must execute a return stroke and the chamber must be reloaded after each separation cycle. As such, the production rate of linear press separators is currently limited to about 10,000 lbs/hour for pork.

Although compression screw separators are useful as second stage separators, they have generally been considered unsuitable for use as first stage separators. Without being limited by theory, it is believed that in a first stage separation role, compression screw separators have a tendency toward bone breakage, which increases the volume of bone matter in the meat that would be fed to the second stage separator.

SUMMARY

In one aspect, an apparatus for separating meat from bone comprises a compression screw having a root and a helical thread extending along the root, wherein the compression screw comprises an infeed portion, a compression portion and a deboning portion, a channel volume between screw flights of the thread is greater in the infeed portion and in the compression portion than in the deboning portion, the channel volume between the screw flights of the thread decreases from the infeed portion through the compression portion to the deboning portion, and curved fillets extend between the root and the screw flights. The apparatus further comprises a screw assembly housing comprising a barrel, the barrel comprising an infeed section, a compression section, a deboning section comprising at least one deboning screen formed by a plurality of meat apertures through the barrel, wherein the meat apertures are configured to permit passage of deboned meat therethrough, and a bone residue outlet. The compression section is disposed between the infeed section and the deboning section, the bone residue outlet is in fluid communication with the deboning section, and an inlet communicates with the infeed section of the barrel and is adapted to feed meat-laden bones into the infeed section. The compression screw is rotatably disposed within the barrel such that the infeed portion of the compression screw is disposed in the infeed section of the barrel in registration with the inlet, the compression portion of the compression screw is disposed in the compression section of the barrel, and the deboning portion of the compression screw is disposed in the deboning section of the barrel in registration with the deboning screen. The barrel and the compression screw are configured to cooperate with one another to encourage axial movement of the meat-laden bones along the compression screw and the barrel and to inhibit the meat-laden bones from co-rotating within the barrel along with the compression screw at least within the deboning section of the barrel. The compression screw is connectable to at least one drive member for driving rotary movement of the compression screw within the barrel.

In an embodiment, the compression screw is a single-flight screw.

In an embodiment, a plurality of circumferentially-spaced, longitudinally extending guide channels are formed in the interior surface of the barrel and extend at least through the deboning section of the barrel substantially parallel to an axis of rotation of the compression screw within the barrel, and the guide channels and the curved fillets cooperate with one another to encourage axial movement of the meat-laden bones along the compression screw and the barrel and to inhibit the meat-laden bones from co-rotating within the barrel along with the compression screw. In a particular embodiment, the guide channels are free of meat apertures.

In an embodiment, an inner surface of the barrel is inwardly crenellated at least through the deboning section to form alternating inwardly projecting merlons and crenels between the merlons wherein the crenels are recessed relative to the merlons, the meat apertures are formed in the merlons, and the guide channels are formed by the crenels.

In an embodiment, the guide channels extend from the compression section into and through the deboning section. In a particular embodiment, the guide channels extend from the infeed section into and through the compression section and into and through the deboning section.

In an embodiment, the bone residue outlet is formed at a terminus of a bone residue outlet section of the barrel extending from the deboning section opposite the compression section, wherein the terminus of the bone residue outlet section defines a terminus of the barrel. In a particular embodiment, the guide channels extend from the infeed section into and through the compression section, into and through the deboning section and into the bone residue outlet section.

In an embodiment, the inner surface of the barrel is infundibular at the terminus of the bone residue outlet section, a correspondingly infundibular pressure cap is received in the terminus of the bone residue outlet section, a tip of the compression screw is received within a bore of the pressure cap, and the bone residue outlet is formed by an annular gap between the pressure cap and the inner surface of the barrel. In a particular embodiment, the pressure cap is movable axially relative to the barrel and the compression screw to vary a volume of the annular gap.

In an embodiment, the channel volume between screw flights is decreased from the infeed portion through the compression portion to the deboning portion by at least one of: increasing a root diameter of the root of the compression screw, decreasing a channel width between the screw flights; and decreasing an inside diameter of the barrel. In a particular embodiment, the channel volume between screw flights is decreased from the infeed portion through the compression portion to the deboning portion by both increasing the root diameter of the compression screw and decreasing the channel width between the screw flights.

In an embodiment, a lead angle of the screw flights is greater in the infeed portion than in the deboning portion, the lead angle decreases from the infeed portion through the compression portion to the deboning portion, and the screw flights are closer together in the deboning portion than in the infeed portion and the compression portion.

In an embodiment, the curved fillets extend along at least ten percent of a flight depth of the screw flights, preferably along at least fifteen percent of the flight depth of the screw flights and more preferably along at least twenty percent of the flight depth of the screw flights.

In an embodiment, the apparatus is a first stage separator and is arranged to feed the deboned meat to a second stage separator.

In another aspect, a method of separating meat from bone comprises feeding meat-laden bones to a compression screw rotating within a barrel, wherein the compression screw and the barrel cooperate to progressively compress the meat-laden bones to force the meat-laden bones radially outward against an inner wall of the barrel as the meat-laden bones move axially along the compression screw, and separating at least a portion of the meat from the meat-laden bones by forcing the meat through apertures in the barrel while inhibiting the meat-laden bones from co-rotating within the barrel along with the compression screw.

In an embodiment, inhibiting the meat-laden bones from co-rotating within the barrel along with the compression screw is accomplished by cooperation of guide channels extending axially along an inner surface of the barrel with curved fillets extending between a root of the compression screw and screw flights of the compression screw.

In an embodiment, the method further comprises feeding the meat forced through the apertures to a second stage separator.

BRIEF DESCRIPTION OF THE DRAWINGS

These and other features will become more apparent from the following description in which reference is made to the appended drawings wherein:

FIG. 7 shows the compression screw of FIG. 6 in isolation;

FIG. 7A is an enlargement of part of FIG. 7 showing an infeed portion of the compression screw of FIG. 6;

DETAILED DESCRIPTION

Reference is now made to FIGS. 1 to 5, which show an illustrative embodiment of an apparatus for separating meat from bone, indicated generally at reference 100. FIGS. 1 to 5 show the apparatus 100 in its assembled form. The apparatus 100 is intended to be used as a first stage separator, and may be used in place of a linear press separator.

A separator apparatus according to the present disclosure may be used for separating meat from bone for such meats as pork, beef, veal, bison, venison, mutton, lamb, as well as poultry meats such as chicken, turkey and waterfowl, and other suitable food animals not listed herein. It will be appreciated that the bones of various animals used for meat will differ in size and shape, and that a separator apparatus according to an aspect of the present disclosure should be constructed so that it is suitably sized for the type of animal whose meat it will process, and in particular for the size of bone (or bone pieces) that will be included in the meat-laden bones to be fed to the separator apparatus. Thus, a separator apparatus to be used for processing meat-laden bones from cattle (beef) will typically be larger than a separator apparatus to be used for processing meat-laden bones from pork, for example.

For illustrative purposes, aspects of the present disclosure, including certain exemplary dimensions, are directed to a separator apparatus for use in processing meat-laden bones from pork. Examples of meat-laden bones that may be processed include, without limitation, whole or partial instances of the following: first rib and breastbone, aitch bone, backbone (with all spinal cord and ganglia removed), blade bone, breastbone, brisket bone, femur bone, humerus bone, neckbone (with all spinal cord and ganglia removed), rib bone, rib tail end, riblet, shank bone, sirloin bone, and spare rib strip. As noted above, separators according to aspects of the present disclosure are not limited to use with pork, and may, with suitable dimensional modification, be used with other types of meat-laden bones.

Figure 1:
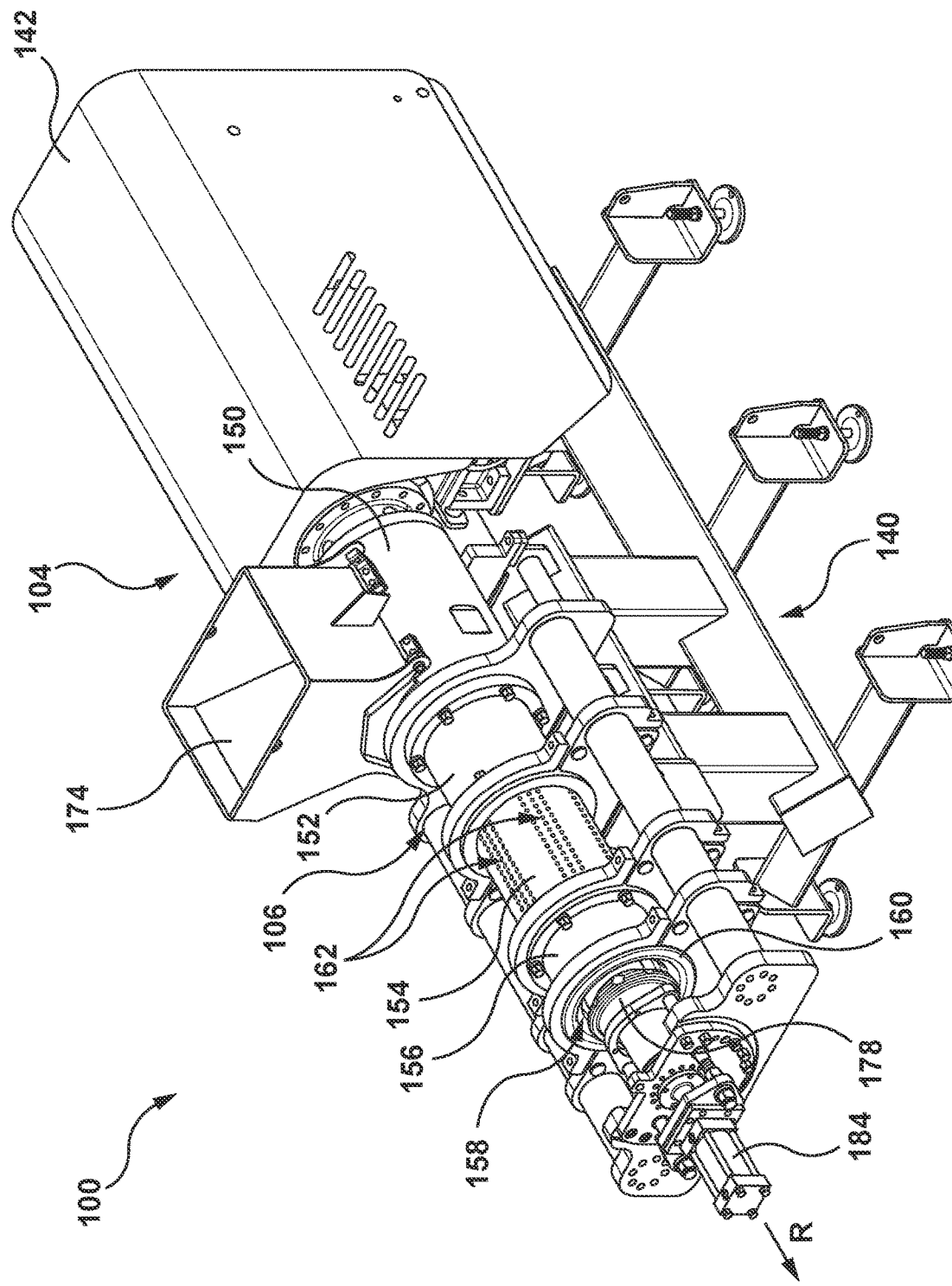
FIG. 1 is a top perspective view of an illustrative apparatus for separating meat from bone according to an aspect of the present disclosure.
Figure 2:
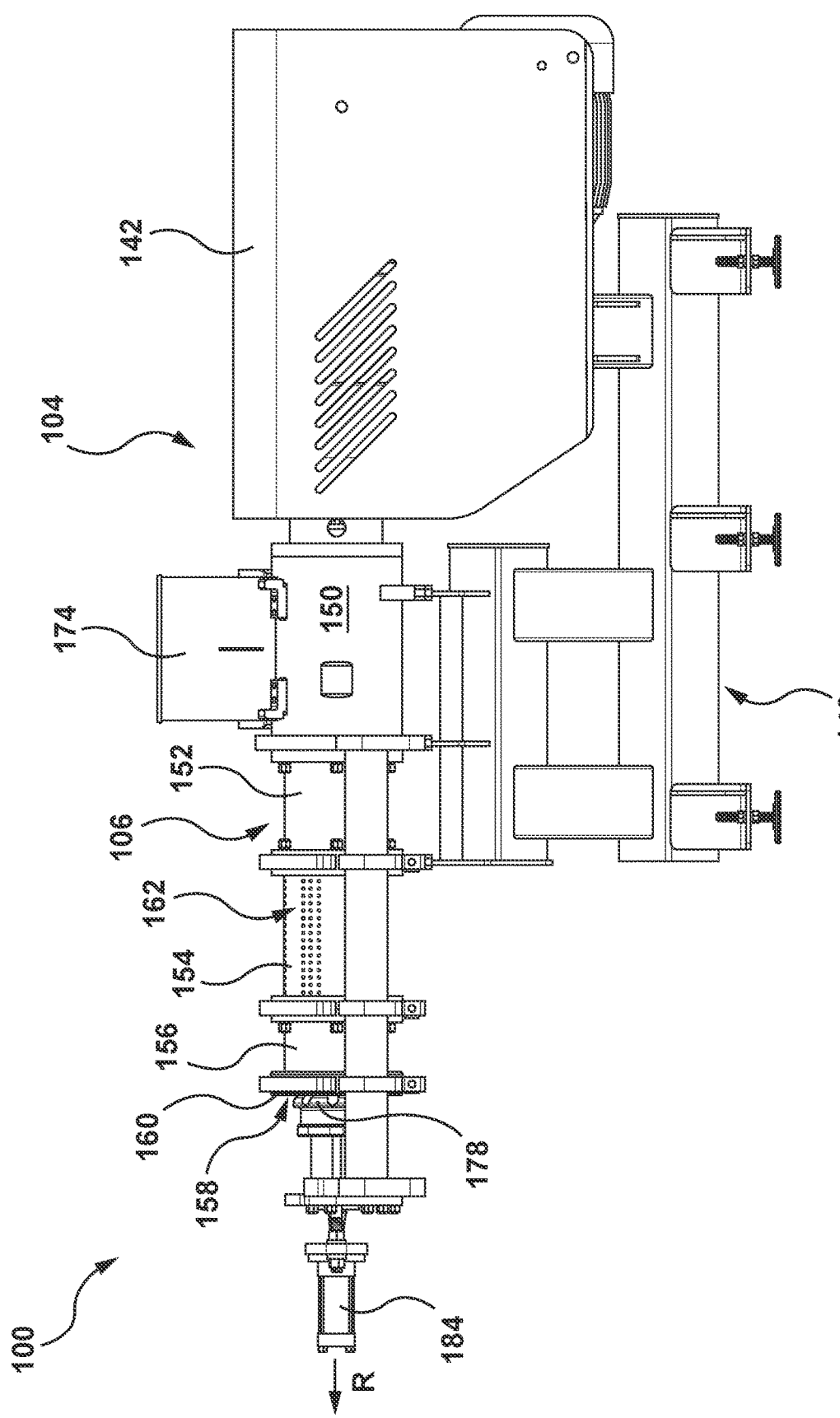
FIG. 2 is a first side elevation view of the apparatus of FIG. 1.
Figure 3:
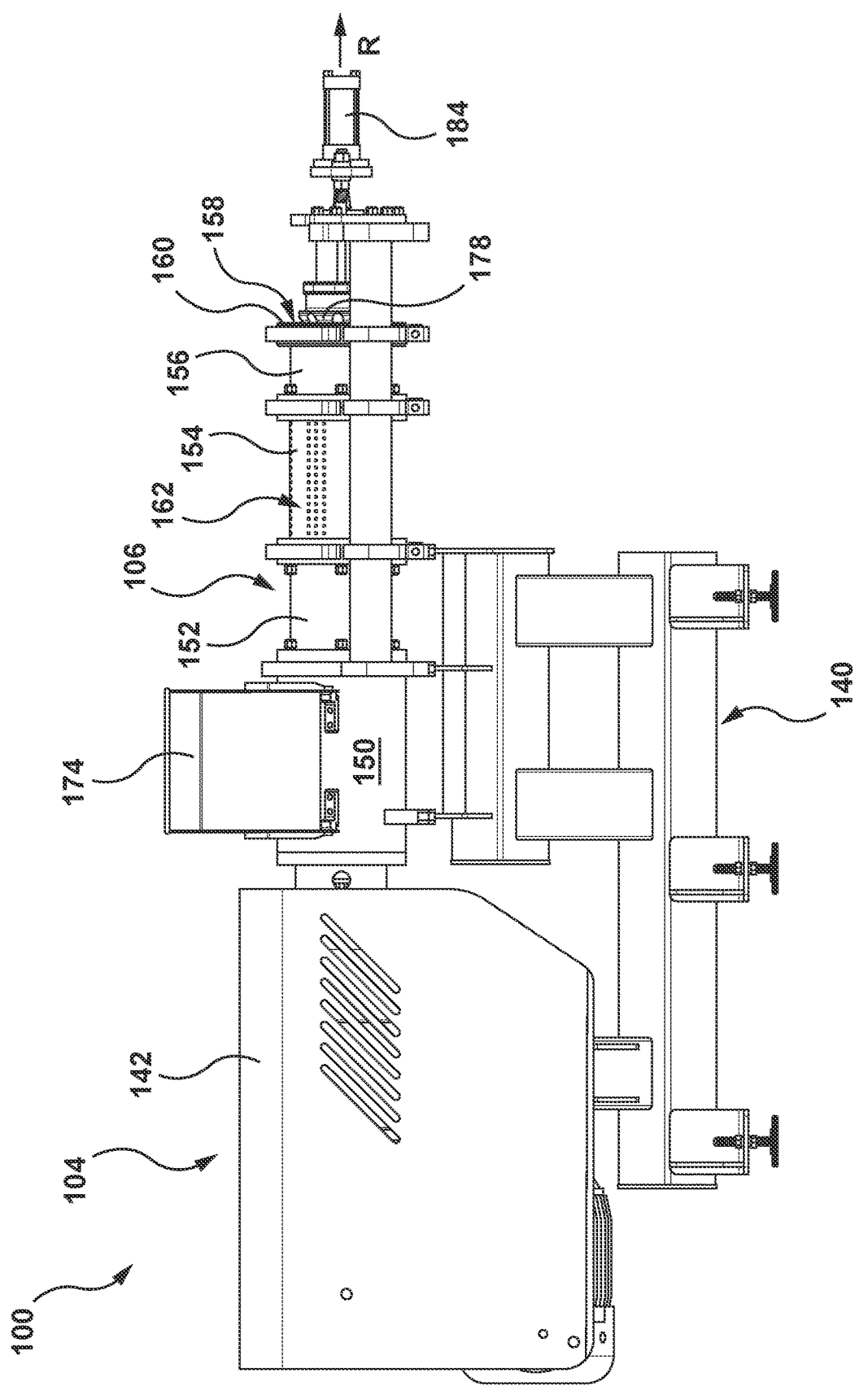
FIG. 3 is a second side elevation view of the apparatus of FIG. 1.
Figure 4:
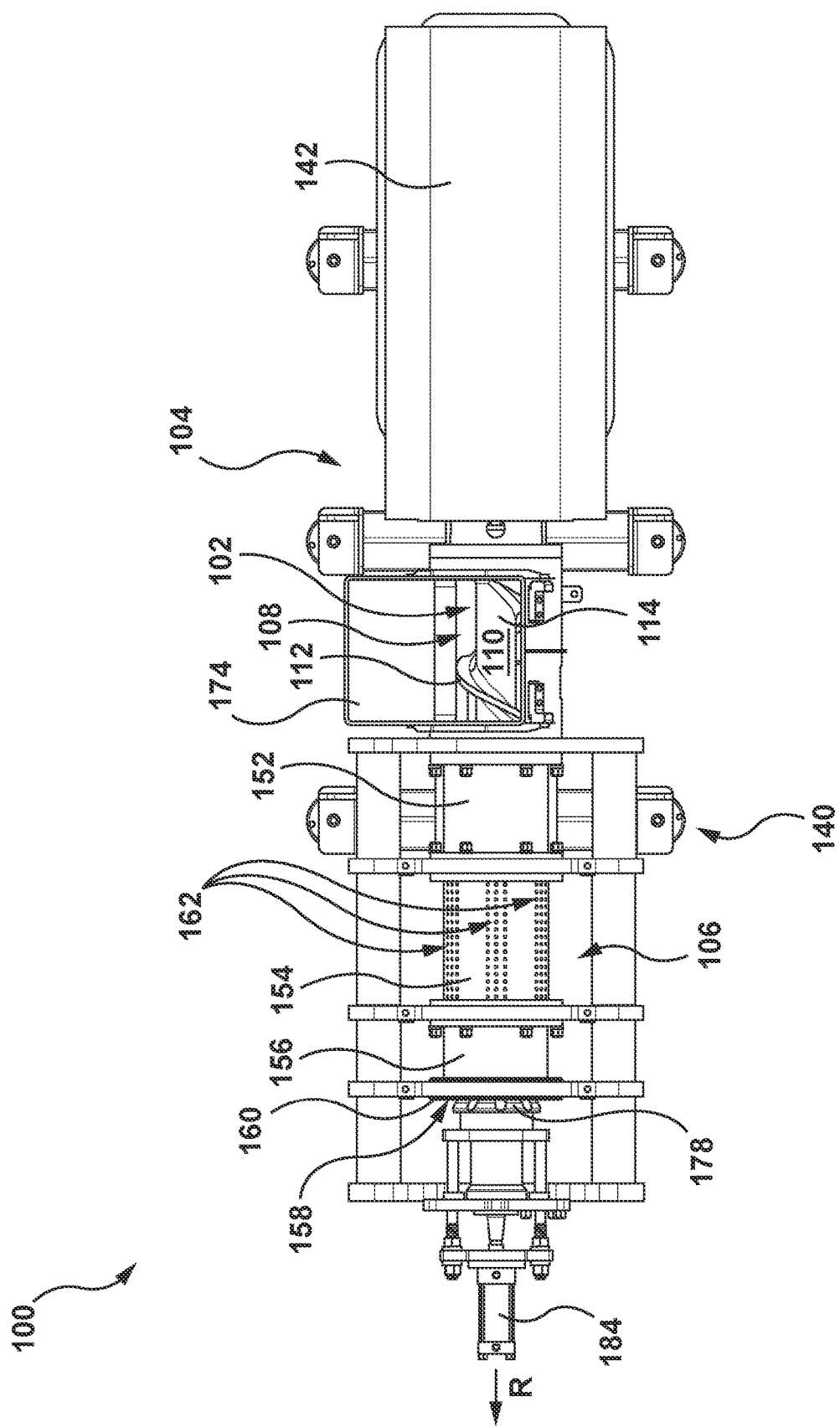
FIG. 4 is a top plan view of the apparatus of FIG. 1.
Figure 5:
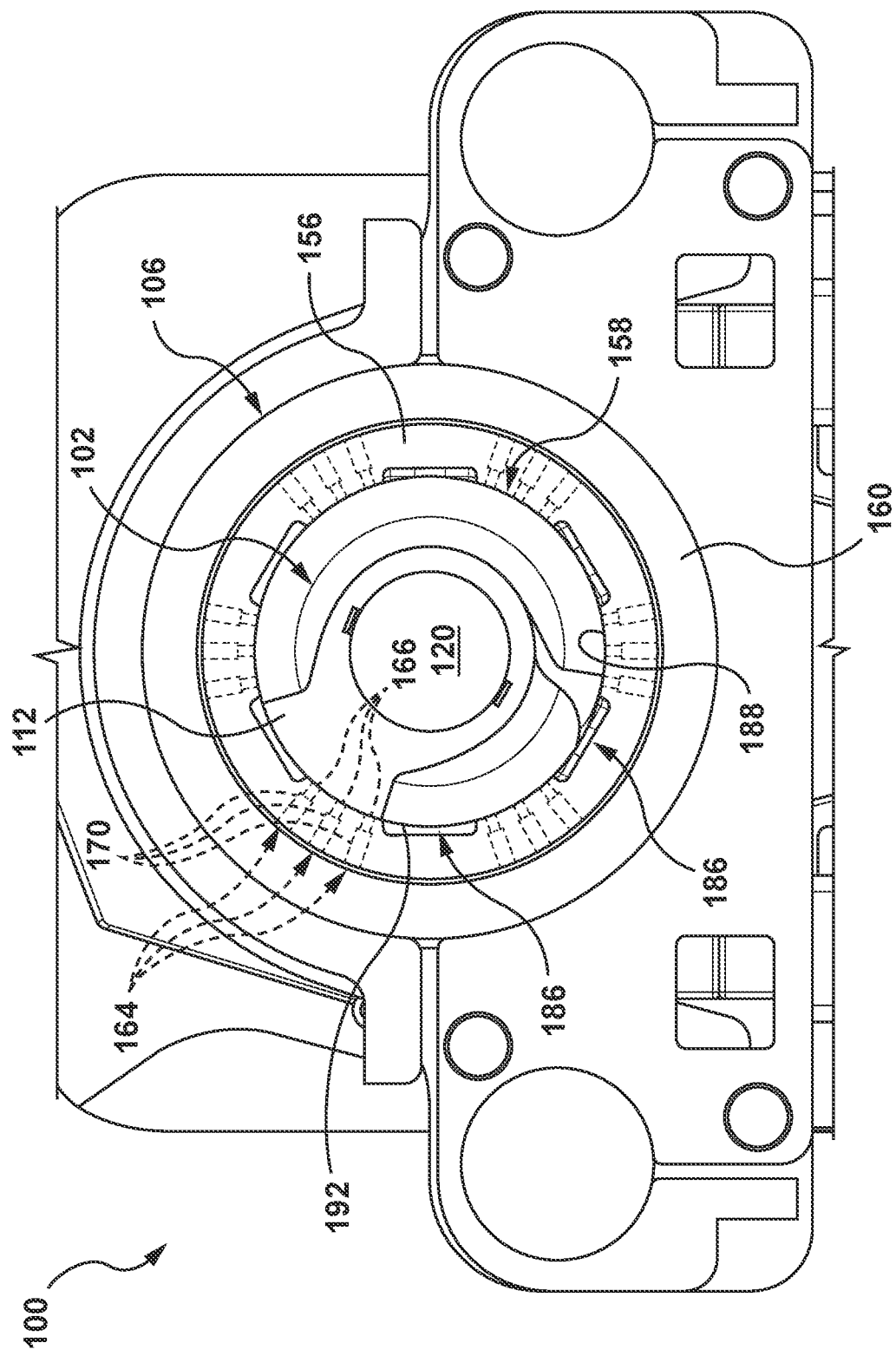
FIG. 5 is an end elevation view of the apparatus of FIG. 1 with a pressure cap thereof removed to show a bone residue outlet thereof.
Figure 6:
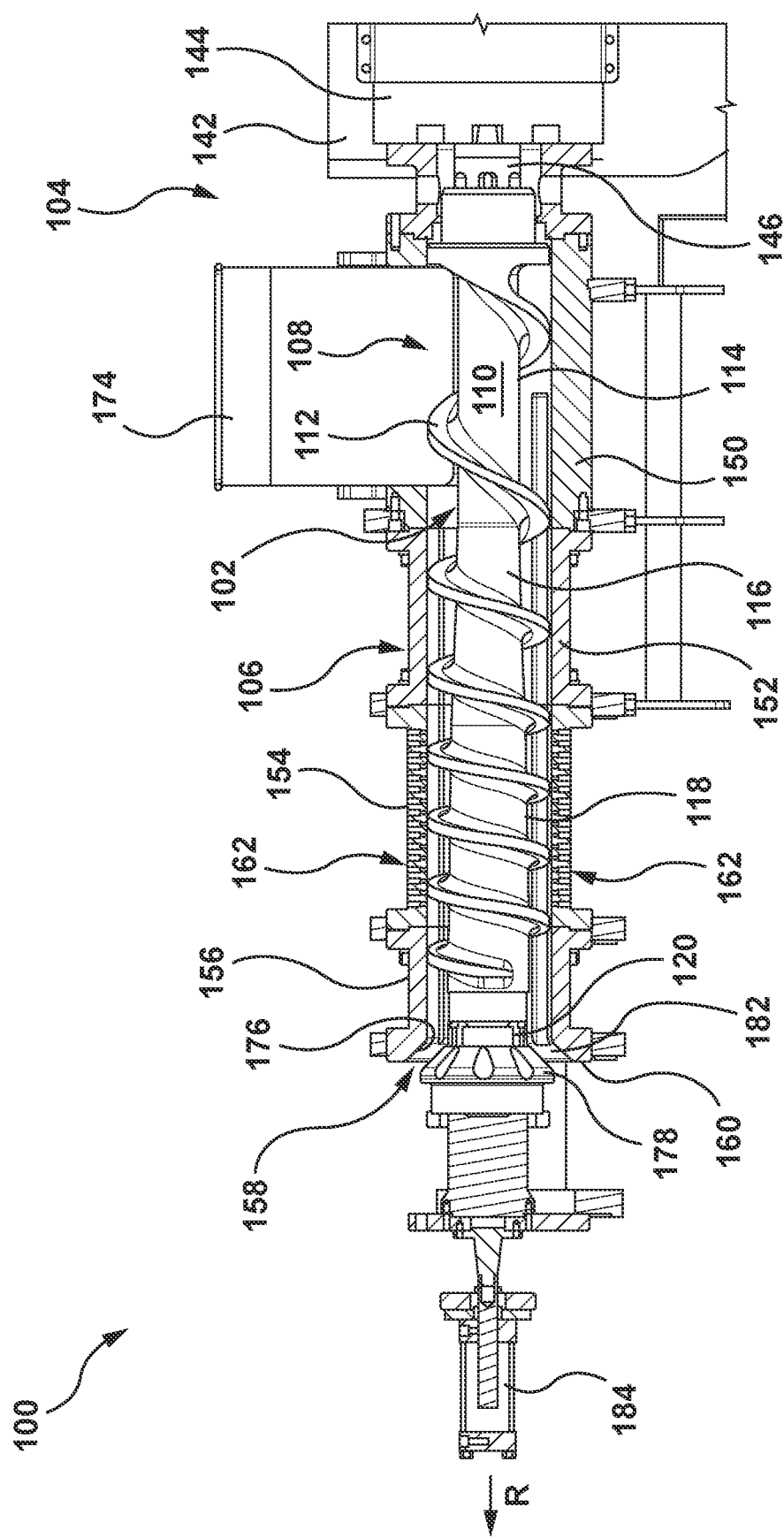
FIG. 6 is a partial cross-sectional side elevation view of the apparatus of FIG. 1, with a barrel thereof shown in cross-section to expose a compression screw and pressure cap thereof.

Reference is now made to FIG. 6 in addition to FIGS. 1 to 5. The apparatus 100 comprises a compression screw 102 and a screw assembly housing 104. The screw assembly housing 104 comprises a barrel 106 within which the compression screw 102 is rotatably disposed, as well as an inlet 108.

Referring now to FIG. 7 and FIGS. 7A through 7C, the compression screw 102 has a root 110 and a helical thread 112 extending along the root 110. In the illustrated embodiment, the compression screw 102 is a single-flight screw. The compression screw comprises an infeed portion 114, a compression portion 116 and a deboning portion 118, terminating in an inwardly necked distal tip 120 (the tip 120 is distal in that it is furthest from the infeed portion 114).

Figure 8:
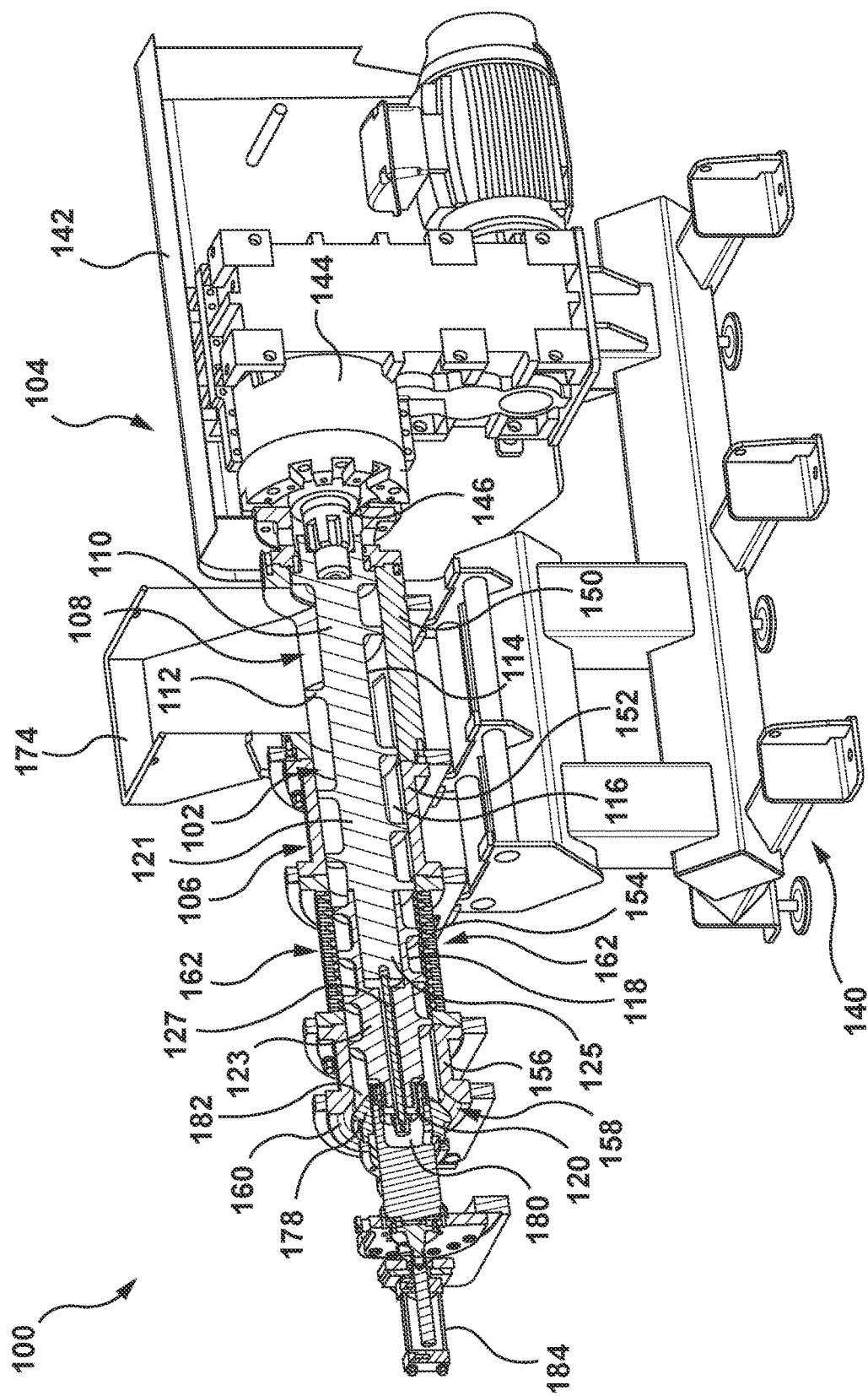
FIG. 8 is a cut-away perspective view of an embodiment of the apparatus of FIG. 1 in which the infeed portion and the compression portion of the compression screw are monolithically formed by a single screw piece and the deboning portion of the compression screw is formed by another single screw piece, with the barrel, compression screw and a pressure cap thereof shown in cross-section.
Figure 8A:
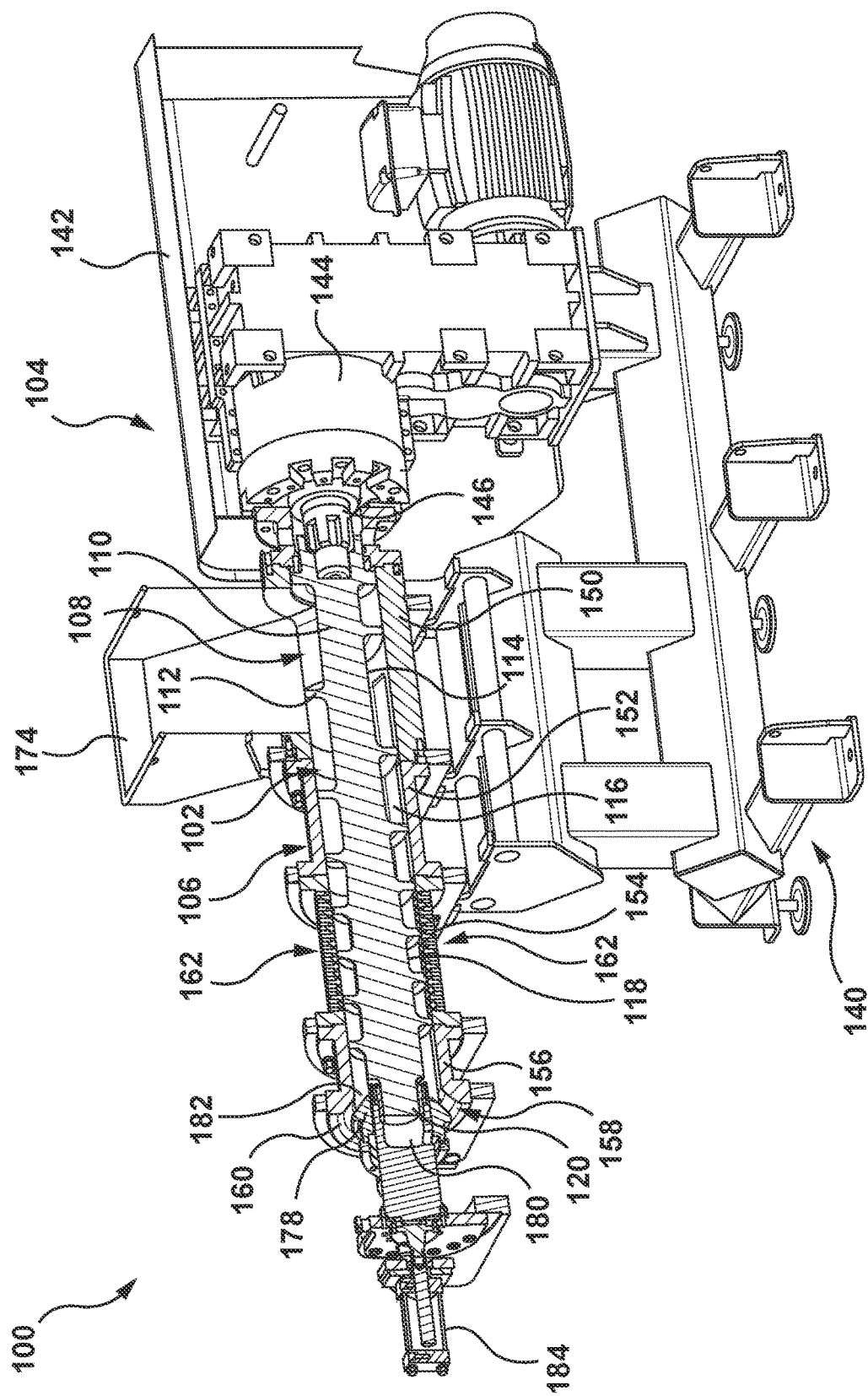
FIG. 8A is a cut-away perspective view of an embodiment of the apparatus of FIG. 1 in which the entire compression screw, including the infeed portion, the compression portion and the deboning portion, is of monolithic construction, with the barrel, compression screw and pressure cap thereof shown in cross-section.

Referring briefly to FIG. 8, in the illustrated embodiment the infeed portion 114 and the compression portion 116 are monolithically formed by a single screw piece 121 and the deboning portion 118 is formed by another single screw piece 123. The screw piece 121 forming the infeed portion 114 and the compression portion 116 has a keyed spline 125 and the screw piece 123 forming the deboning portion 118 slides onto this keyed spline 125. The screw pieces 121, 123 are secured together by an elongated fastening bolt 127 passing through the screw piece 123 forming the deboning portion 118 and into the screw piece 121 forming the infeed portion 114 and the compression portion 116. This construction allows for replacement of the deboning portion 118 to provide different configurations and different amounts of compression (as discussed further below); in other embodiments, the compression screw may be of monolithic construction. FIG. 8A shows a preferred embodiment in which the entire compression screw 102, including the infeed portion 114, the compression portion 116 and the deboning portion 118, is of monolithic construction, with like reference numerals denoting like features. With either the two-piece construction or the monolithic construction, a wear bushing may be used, as will be understood by one of ordinary skill in the art, now informed by the present disclosure.

Returning to FIG. 7 and FIGS. 7A to 7C, the helical thread 112 comprises infeed screw flights 122 along the infeed portion 114, compression screw flights 124 along the compression portion 116 and deboning screw flights 126 along the deboning portion 118. The channel volume in each of the infeed portion 114, the compression portion 116 and the deboning portion 118 is measured between the respective screw flights 122, 124, 126 of the thread 112, and represents the volume of space between the screw flights 122, 124, 126, taking account of the barrel 106 in which the compression screw 102 will rotate. The channel volume is thus a function of the flight width (distance between screw flights), the flight depth (the radial distance that the screw flight extends from the root) and the size (radius/diameter) of the root, as well as the inside diameter of the barrel.

Continuing to refer to FIG. 7 and FIGS. 7A through 7C, the channel volume decreases from the infeed portion 114 through the compression portion 116 to the deboning portion 118. Accordingly, an infeed channel volume 128 (the channel volume in the infeed portion 114) is greater than a compression channel volume 130 (the channel volume in the compression portion 116), which in turn is greater than a deboning channel volume 132 (the channel volume in the deboning portion). The channel volume can be made to decrease from the infeed portion 114 through the compression portion 116 to and through the deboning portion 118 by a variety of geometric features. For example, increasing the diameter of the root 110 of the compression screw 102 will decrease the channel depth and thereby decrease channel volume, decreasing the channel width between the screw flights will also decrease the channel volume, as will decreasing the inside diameter of the barrel. These approaches may be used individually or in combination. For example, in the illustrated embodiment, the channel volume is decreased from the infeed portion 114 through the compression portion 116 to the deboning portion 118 by both increasing the diameter of the root 110 of the compression screw 102 and decreasing the channel width so that the deboning screw flights 126 are closer together than the compression screw flights 124, which are closer together than the infeed screw flights 122. In the illustrated embodiment, the diameter of the root 110 of the compression screw 102 is substantially constant along the infeed portion 114, where the root diameter is smallest, and then increases gradually along the compression portion 116 toward and through the deboning portion 118 to the distal end thereof (the end that is distal from the compression portion 116), where the root diameter of the compression screw 102 is greatest.

In one preferred embodiment, the diameter of the root 110 is about 5½ inches for the infeed portion 114, and then begins a constant taper from the junction between the infeed portion 114 and the compression portion 116, through the compression portion 116 and through the deboning portion 118. In this embodiment, the diameter of the root 110 is about 7¼ inches at the distal end of the deboning portion 118, that is, the end that is distal from the infeed portion 114.

In addition, the lead angle of the screw flights 122, 124, 126 decreases from the infeed portion 114 through the compression portion 116 to the deboning portion 118. Thus, the infeed lead angle $\theta_{IN}$ on the infeed screw flights 122 in FIG. 7A is greater than the compression lead angle $\theta_{COM}$ on the compression screw flights 124 in FIG. 7B, which in turn is greater than the deboning lead angle $\theta_{DEB}$ on the deboning screw flights 126 in FIG. 7C.

Figure 7B:
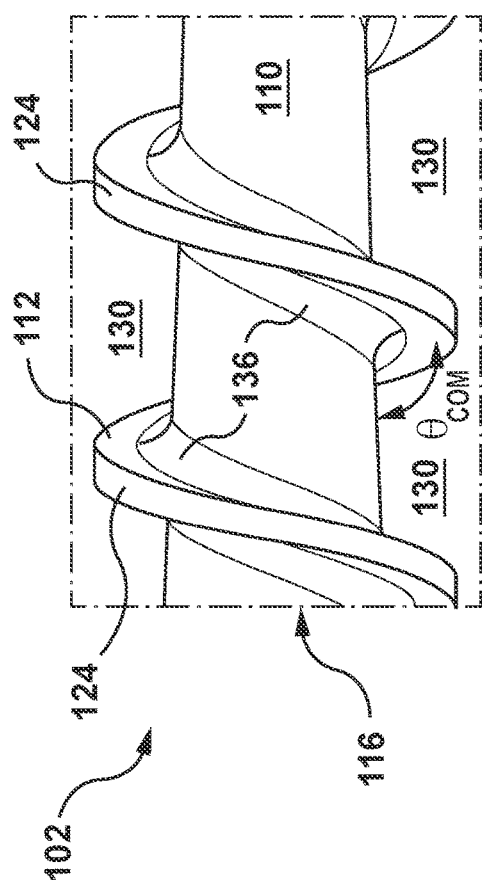
FIG. 7B is an enlargement of part of FIG. 7 showing a compression portion of the compression screw of FIG. 6.
Figure 7C:
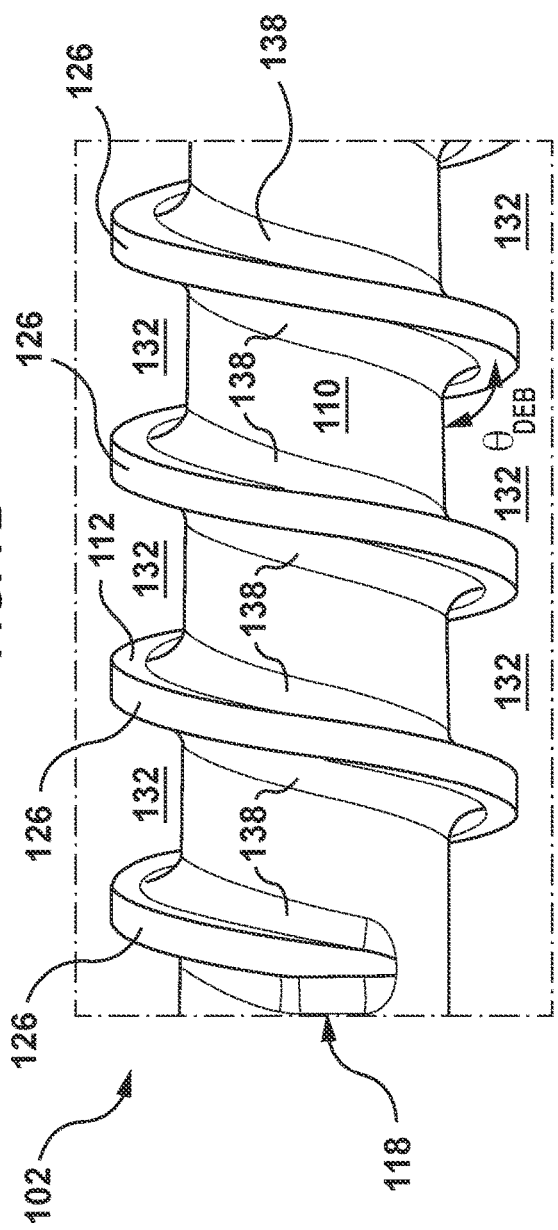
FIG. 7C is an enlargement of part of FIG. 7 showing a deboning portion of the compression screw of FIG. 6.

Now referring to FIGS. 7A to 7C in particular, it can be seen that in the illustrative embodiment, convexly curved fillets extend between the root 110 and the screw flights 122, 124, 126. These include infeed fillets 134 on the infeed portion 114, compression fillets 136 on the compression portion 116, and deboning fillets 138 on the deboning portion 118. The convexly curved fillets 134, 136, 138 extend along at least ten percent of the flight depth of the screw flights 122, 124, 126, preferably along at least fifteen percent of the flight depth of the screw flights 122, 124, 126, and still more preferably along at least twenty percent of the flight depth of the screw flights 122, 124, 126. Moreover, the outer diameter of the thread 112 is substantially constant along the length of the compression screw 102. In one preferred embodiment, the outer diameter of the thread 112 is between about 9 inches and about 12 inches. Because the outer diameter of the thread 112 is substantially constant, as the diameter of the root 110 increases from the infeed portion 114 where it smallest, along the compression portion 116 toward and through the deboning portion 118 where it is largest, the flight depth (measured from the root 110) increases and the proportion of the flight depth of the screw flights 122, 124, 126 along which the fillets 134, 136, 138 extend also increases. Thus, the deboning fillets 138 extend along a larger proportion of the deboning screw flights 126 than the compression fillets 136 extend along the compression screw flights 124, and in turn the compression fillets 136 extend along a larger proportion of the compression screw flights 124 than the infeed fillets 134 extend along the infeed screw flights 122.

Referring now again to FIG. 8 (and also to FIGS. 1 to 4), the screw assembly housing 104 is carried by a support 140, which also carries a motor housing 142 in which is disposed a motor 144 for driving the compression screw 102. As such, the compression screw 102 is connectable to a drive member 146 of the motor 144 for driving rotary movement of the compression screw 102 within the barrel 106.

Figure 9:
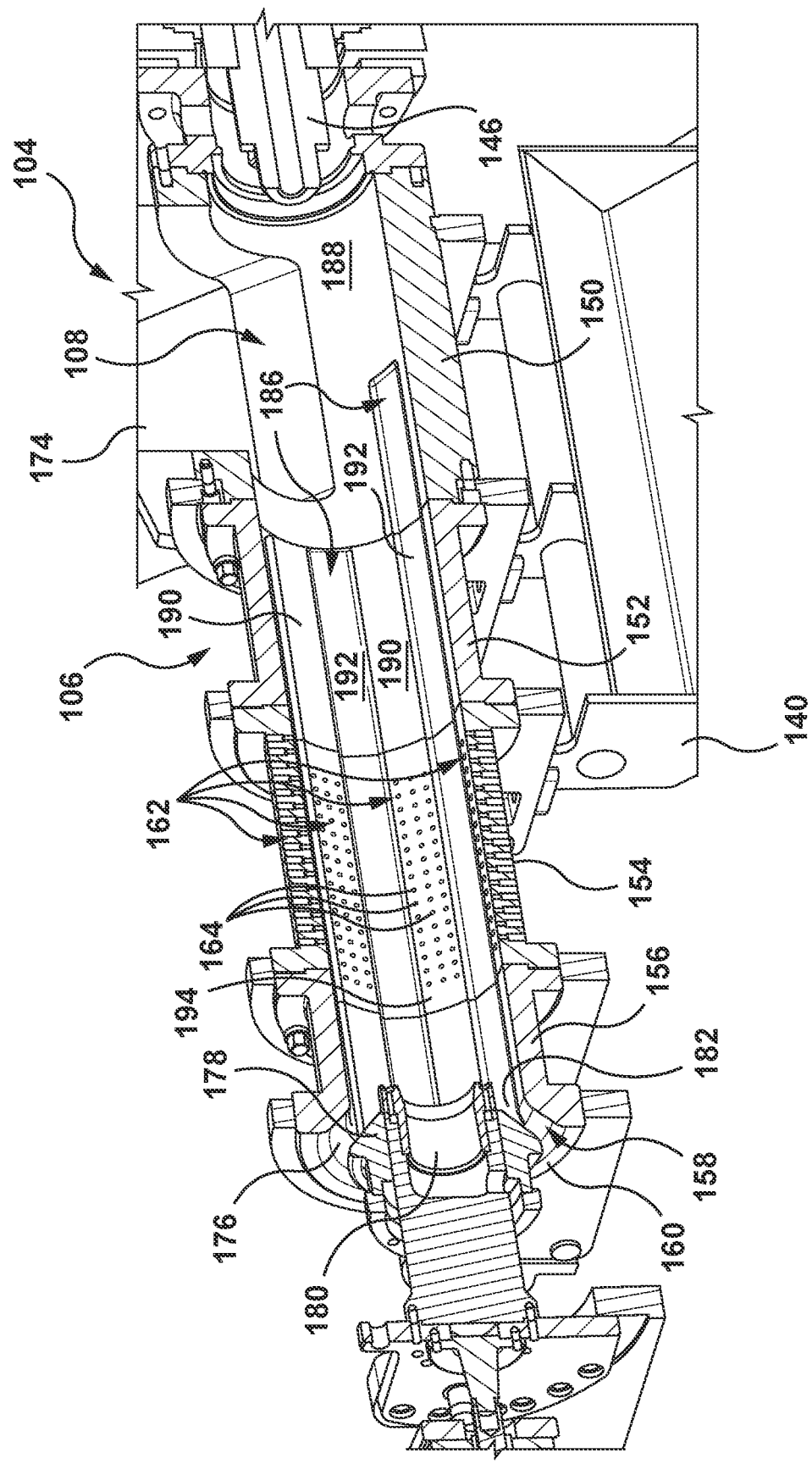
FIG. 9 is a perspective view of the apparatus of FIG. 1 with the barrel and pressure cap thereof shown in cross section and the compression screw removed.

Continuing to refer to FIG. 8 and now also to FIGS. 6 and 9, the barrel 106 comprises an infeed section 150, a compression section 152, a deboning section 154 and a bone residue outlet section 156, with an annular bone residue outlet 158 formed at a terminus 160 of the bone residue outlet section 156. The terminus 160 of the bone residue outlet section 156 also defines the terminus of the barrel 106. In the illustrated embodiment, the infeed section 150, the compression section 152, the deboning section 154 and the bone residue outlet section 156 are each formed by individual barrel pieces having outwardly projecting annular flanges that are bolted together; other assembly techniques are also contemplated. In other embodiments, two or more sections of the barrel, or the entire barrel, may be of monolithic construction. The infeed section 150 is disposed adjacent the motor housing 142, the compression section 152 is disposed between the infeed section 150 and the deboning section 154, and the deboning section 154 is disposed between the compression section 152 and the bone residue outlet section 156. The bone residue outlet section 156 extends from the deboning section 154 opposite the compression section 152. Each adjacent section of the barrel 106 is in fluid communication with each adjacent section. Thus, the infeed section 150 communicates with the compression section 152, which communicates with the deboning section 154, which communicates with the bone residue outlet section 156; hence the bone residue outlet 158 is in fluid communication with the deboning section 154.

Figure 9A:
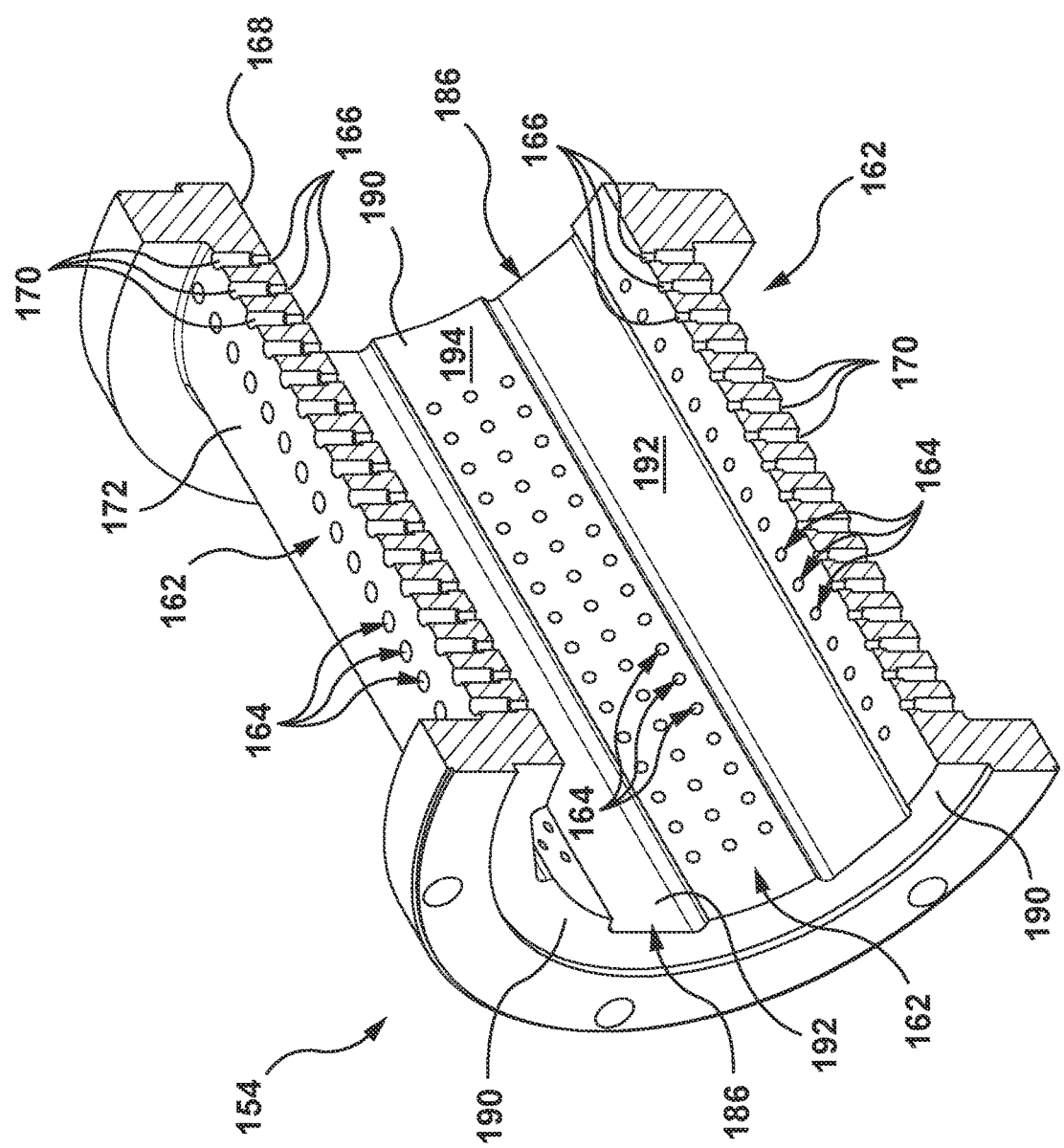
FIG. 9A is an enlarged cross-sectional view of a deboning section of the barrel.

Referring now to FIG. 9A, the deboning section 154 comprises a plurality of deboning screens 162 formed by a plurality of meat apertures 164 (see FIG. 9) through the deboning section 154 of the barrel 106. The meat apertures 164 are configured to permit passage of deboned meat therethrough, while inhibiting the passage of larger pieces of bone. The term "deboned meat", as used herein, does not require that the meat be entirely devoid of bone matter. Rather, as used herein the term "deboned meat" means meat having bone particles measuring up to 25 mm in size, measured along the longest/largest dimension of a given piece of bone.

In the embodiment shown, the meat apertures 164 in the deboning section 154 each include a sizing bore 166 extending outwardly from the interior surface 168 of the deboning section 154 and a counterbore 170 extending inwardly from the outer surface 172 of the deboning section 154, coaxially with each sizing bore 166. In a preferred embodiment, the sizing bores 166 are at least 0.120 inches in length, but otherwise kept as short as practicable to reduce the pressure required to force deboned meat through the sizing bores 166. Without being limited by theory, it is believed that the counterbores 170 improve meat texture and reduce temperature increases in the deboning section 154. The dimensions of the sizing bores 166 and the counterbores 170 will vary depending on the type of animal and the type of bone. For example, and without limitation, for pork or beef, the sizing bores 166 may be between about 2 mm in diameter to about 15 mm in diameter, with the counterbores 170 being about 1 mm to about 4 mm wider than the sizing bores 166. By way of non-limiting example, an 8 mm sizing bore 166 may have a 10 mm counterbore 170. In one preferred embodiment, the meat apertures 164 are radial with respect to the barrel 106, that is, normal to the axis of rotation R; in other embodiments the meat apertures 164 may have a pitch relative to the barrel 106 such that the meat apertures 164 are non-normal to the axis of rotation R.

Referring again to FIGS. 6, 8 and 9, the inlet 108 communicates with the infeed section 150 of the barrel 106 and is adapted to feed meat-laden bones into the infeed section 150. In the illustrated embodiment the inlet 108 is fed by a chute 174 but this is merely one example; in other embodiments the inlet may be fed by a conveyor belt, a pump, or any other suitable feed mechanism.

As noted above, the compression screw 102 is rotatably disposed within the barrel 106. More particularly, as shown in FIGS. 6 and 8 the infeed portion 114 of the compression screw 102 is disposed in the infeed section 150 of the barrel 106 in registration with the inlet 108, the compression portion 116 of the compression screw 102 is disposed in the compression section 152 of the barrel 106, and the deboning portion 118 of the compression screw 102 is disposed in the deboning section 154 of the barrel 106 in registration with the deboning screens 162. The deboning portion 118 of the compression screw 102 extends beyond the deboning section 154 of the barrel 106 into the bone residue outlet section 156 of the barrel 106.

At the terminus 160 of the bone residue outlet section 156, the inner surface 176 of the barrel 106 is infundibular. A correspondingly infundibular pressure cap 178 is received in the inwardly infundibular terminus of the bone residue outlet section 156, and the distal tip 120 of the compression screw 102 is received within an axial bore 180 of the pressure cap 178 (see FIG. 8 in particular). The bone residue outlet 158 is formed by an annular gap 182 between the pressure cap 178 and the inner surface 176 of the barrel at the terminus 160 of the bone residue outlet section 156. The pressure cap 178 is movable axially relative to the barrel 106 and the compression screw 102 to vary a volume of the annular gap 182, and a pressure cap actuator 184 is coupled to the pressure cap 178 to effect axial movement of the pressure cap 178 toward and away from the barrel 106 and the compression screw 102. The pressure cap actuator 184 may be, for example, a solenoid or a piston-cylinder assembly. Of note, the pressure cap 178 is non-rotatable relative to the barrel 106, and in particular the terminus 160 thereof.

As shown in FIGS. 6 and 8, the thread 112 of the compression screw 102 engages the inner surface of the barrel 106 along substantially the entire length thereof. As used herein, the term "engages", although not necessarily requiring actual physical contact, denotes an extremely close, flush fit between two components. For example, a spacing between about 0.005 inches and about 0.100 inches would fall within the meaning of "engages". Thus, the thread 112 on the infeed portion 114 of the compression screw 102 engages the inner surface of the infeed section 150 of the barrel 106, the thread 112 on the compression portion 116 of the compression screw 102 engages the inner surface of the compression section 152 of the barrel 106, and the thread 112 on the deboning portion 118 of the compression screw 102 engages the inner surface of the deboning section 154 of the barrel 106 as well as the inner surface of the bone residue outlet section 156 of the barrel 106. In a preferred embodiment where the outer diameter of the thread 112 is between about 9 inches and about 12 inches, the inner diameter of the barrel 106 would be the same, plus the clearance value, which would add between about 0.010 inches and about 0.200 inches (double the radial clearance of between about 0.005 inches and about 0.100 inches).

Importantly, and in fact critically, the barrel 106 and the compression screw 102 are configured to cooperate with one another to encourage axial movement of the meat-laden bones along the compression screw 102 and the barrel 106 and, at least within the deboning section 154 of the barrel 106, to inhibit the meat-laden bones from co-rotating within the barrel 106 along with the compression screw 102. Thus, while the compression screw 102 rotates within the barrel 106, the meat-laden bones generally proceed axially along the barrel 106 but without substantial rotation within the barrel 106; the threads 112 of the compression screw 102 generally rotate past the meat-laden bones. Without being limited by theory, it is believed that when the meat-laden bones in a conventional compression screw separator rotate within the barrel along with the compression screw, this causes bone pieces to grind on the inside of the barrel and break at the junction of the thread and the inner surface of the barrel. This increases the number of bone fragments that end up in the resulting meat, increasing the calcium levels and thereby reducing the quality of the meat.

One method for inhibiting the meat-laden bones from co-rotating within the barrel 106 along with the compression screw 102 involves the use of guide channels.

Figure 10:
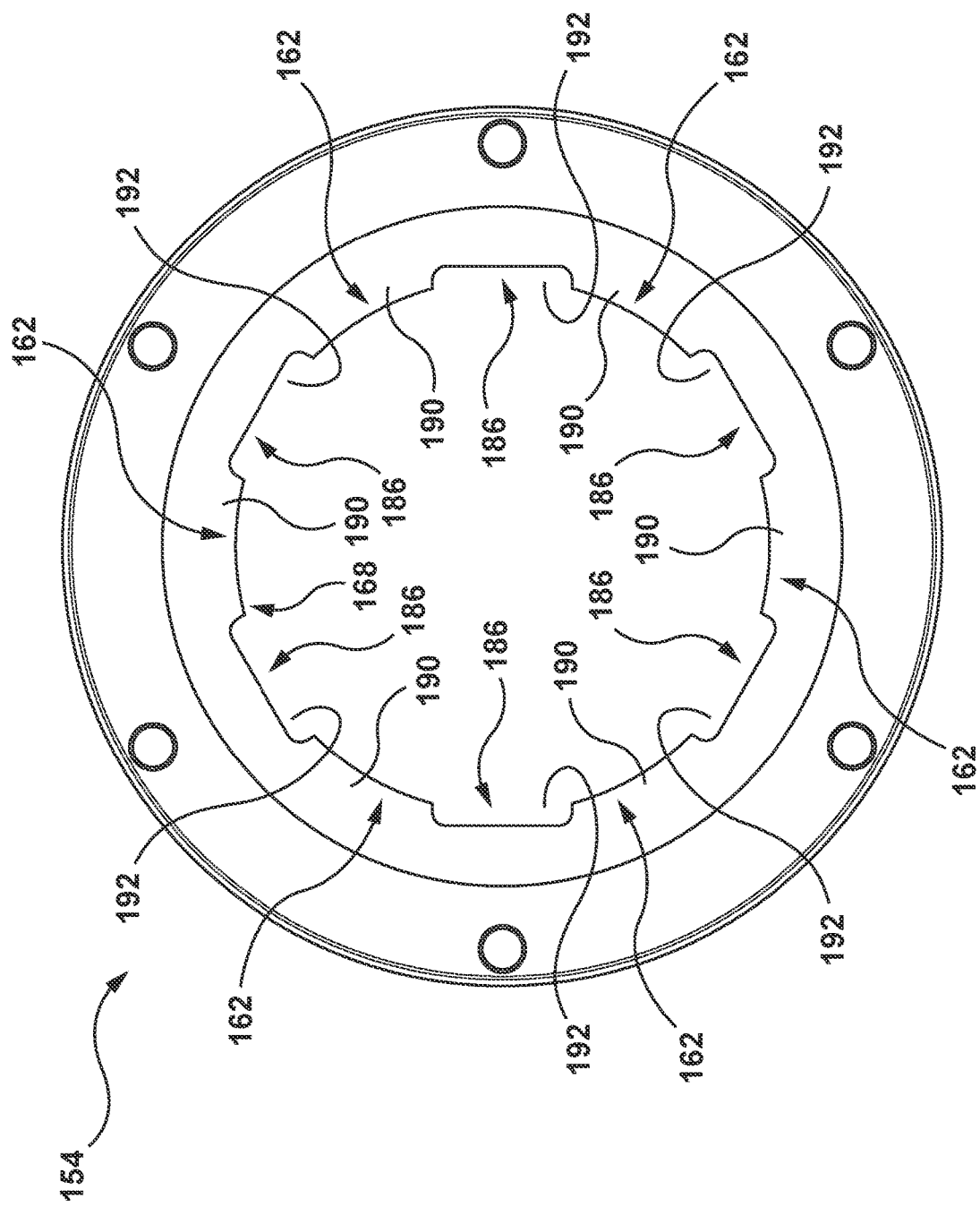
FIG. 10 is an end view of the deboning section of the barrel.

Turning now to FIGS. 9, 9A and 10, in the illustrated embodiment a plurality of circumferentially-spaced, longitudinally extending guide channels 186 are formed in the interior surface 188 of the barrel 106 and extend substantially parallel to an axis of rotation R of the compression screw 102 within the barrel 106. Thus, the guide channels 186 are substantially linear and non-helical.

The guide channels 186 extend at least through the deboning section 154 of the barrel 106, preferably from the compression section 152 into and through the deboning section 154, more preferably from the infeed section 150 into and through the compression section 152 and into and through the deboning section 154, and still more preferably from the infeed section 150 into and through the compression section 152, into and through the deboning section 154 and into the bone residue outlet section 156 as shown in the illustrated embodiment.

The interior surface 188 of the barrel 106 is inwardly crenellated from the infeed section 150 into and through the compression section 152, into and through the deboning section 154 and into the bone residue outlet section 156. This crenellation forms alternating inwardly projecting merlons 190 and crenels 192 between the merlons 190, with the crenels 192 being outwardly recessed relative to the merlons 190. The guide channels 186 are formed by the crenels 192. The meat apertures 164 are formed in the merlons 190, and in the illustrated embodiment no meat apertures are formed in the crenels 192 so that the guide channels are free of meat apertures. Thus, each of the merlons 190 functions as a deboning screen 162. In other embodiments, meat apertures may be formed in the crenels as well.

In one preferred embodiment, the crenels 192, and hence the guide channels 186, are between about 0.150 inch deep and about 0.625 inch deep, and the width of each crenel 192, and hence of each the guide channel 186, is obtained by dividing a value equal to between about 30% and about 50% of the inside circumference of the barrel 106 by the number of crenels 192/guide channels 186. Typically, there will be between three and ten crenels 192/guide channels 186, although some embodiments may have more or fewer crenels/guide channels. The crenels, and hence the guide channels, are not limited to the shape and configuration shown in the drawings. For example, and without limitation, while the crenels 192, and hence the guide channels 186, are shown as having a generally planar surface parallel to a tangent of the bore of the barrel 106, crenels/guide channels may have other shapes, such as curved. For example, crenels/guide channels may have surfaces in the form of an arc that is concentric with the bore of the barrel, or offset therefrom. No particular limitation on the shape of the crenels/guide channels is implied.

The guide channels 186 and the curved fillets 134, 136, 138 cooperate with one another to encourage axial movement of the meat-laden bones along the compression screw 102 and the barrel 106 and to inhibit the meat-laden bones from co-rotating within the barrel 106 along with the compression screw. Without being limited by theory, it is believed that the guide channels 186 urge the meat-laden bones to slide axially along the barrel 106 and anchor the meat-laden bones against rotation while the curved fillets 134, 136, 138 enable the helical thread 112 of the compression screw 102 to slide past the meat-laden bones as the compression screw 102 rotates within the barrel 106. As noted above, the pressure cap 178 is non-rotatable relative to the barrel 106, and in particular the terminus 160 thereof, which further inhibits rotation of the meat-laden bones within the barrel 106, even at the bone residue outlet 158.

The guide channels 186 and curved fillets 134, 136, 138 shown and described herein are merely one illustrative mechanism for inhibiting the meat-laden bones from co-rotating in the barrel along with the compression screw, and are not intended to be limiting.

The parameters of the deboning portion 118 of the compression screw 102 are selected so that the radial distance between the outer surface of the root 110 of the compression screw 102 and the inner surfaces 194 of the merlons 190 at least in the deboning section 154, and preferably along the infeed section 150 and the compression section 152 as well, and even more preferably along the entire length of the barrel 106, is greater than the typical diameter of the largest type of bone in the meat-laden bones for which the separator apparatus 100 is to be used. For example, the radial distance may be selected to be larger than the 95th or 99th percentile size of the largest type of bone. Without being limited by theory, it is believed that the aforesaid structure inhibits bone pieces from being caught between the outer surface of the root 110 of the compression screw 102 and the inner surfaces 194 of the merlons 190, thereby providing a radial distance that is generally sufficient to allow the bone piece to deflect away from the inner surfaces 194 of the merlons 190 rather than being ground against the meat apertures 164 in the deboning section 154 by rotation of the compression screw 102. It is further believed that this inhibits small bone fragments from being ground away from the bones and exiting the deboning section 154 by way of the meat apertures 164. Bone breakage is less of a concern once the meat-laden bones have proceeded past the deboning section 154 into the bone residue outlet section 158 as such breakage will not affect the deboned meat leaving the deboning section 154.

In operation, the meat-laden bones are supplied to the inlet 108 and received in the infeed section 150 of the barrel 106, where the co-located infeed portion 114 of the rotating compression screw 102 urges the meat-laden bones toward the compression section 152 of the barrel 106 and the co-located compression portion 116 of the compression screw 102. Within the compression section 152 of the barrel 106, the decrease in channel volume (the infeed channel volume 128 being greater than the compression channel volume 130) increases pressure on the meat-laden bones and urges the meat-laden bones radially outwardly against the interior surface 188 of the barrel 106 as the meat-laden bones move axially along the barrel 106. Rotation of the compression screw 102 continues to urge the meat-laden bones into the deboning section 154, where the decrease in channel volume in the co-located deboning portion 118 of the compression screw (the compression channel volume 130 being greater than the deboning channel volume 132) further increases the radial outward pressure on the meat-laden bones. Because the meat-laden bones are under pressure as a result of the decrease in channel volume, as the meat-laden bones move along the deboning section 154, meat is forced against the inner surfaces 194 of the merlons 190 forming the deboning screens 162 so that deboned meat emerges through the meat apertures 164.

Bone residue, that is, the remnants of the meat-laden bones that reach the bone residue outlet section 156 of the barrel 106, exit the barrel 106 by way of the bone residue outlet 158.

As noted above, in one embodiment, the apparatus 100 is a first stage separator. As such, the apparatus 100 may be arranged to feed the deboned meat emerging from the meat apertures 164 to a second stage separator for further processing. For example, the second stage separator may be, without limitation, any of a ProMax300, ProMax500, ProMax1000, ProMax1500, ProMax3000, ProMax6000, ProMax7000 or ProMax9000 model compression screw separator, all of which are offered by Poss Design Limited, having an address at 2940 Portland Drive, Oakville, Ontario, L6H 5W8 Canada.

For example, the coarseness or "grind size" resulting from the apparatus 100 as a first stage separator may be between about 2 mm and about 15 mm, depending on the type of meat, and the coarseness resulting from the second stage separator (depending on the particular second stage separator used) may be between about 0.6 mm and about 3 mm.

In certain preferred embodiments, the compression ratio, that is, the reduction in the deboning channel volume 132 between axially successive deboning screw flights 126, is between about 20% and about 50%. The result is that about 20% to about 50% of the volume of the meat-laden bones will be expelled through the meat apertures 164 as deboned meat, with the remaining 80% to 50% of material, being majority bone matter, will be discharged through the annular bone reside outlet 158. In one preferred embodiment, the compression ratio is about 40%, so that about 40% of the volume of the meat-laden bones is expelled through the meat apertures 164 and the remaining 60% (mostly bone) is discharged through the annular bone reside outlet 158. As noted above, in some embodiments the deboning portion 118 of the compression screw 102 may be replaced; this allows for changes in the compression ratio.

Figure 11:
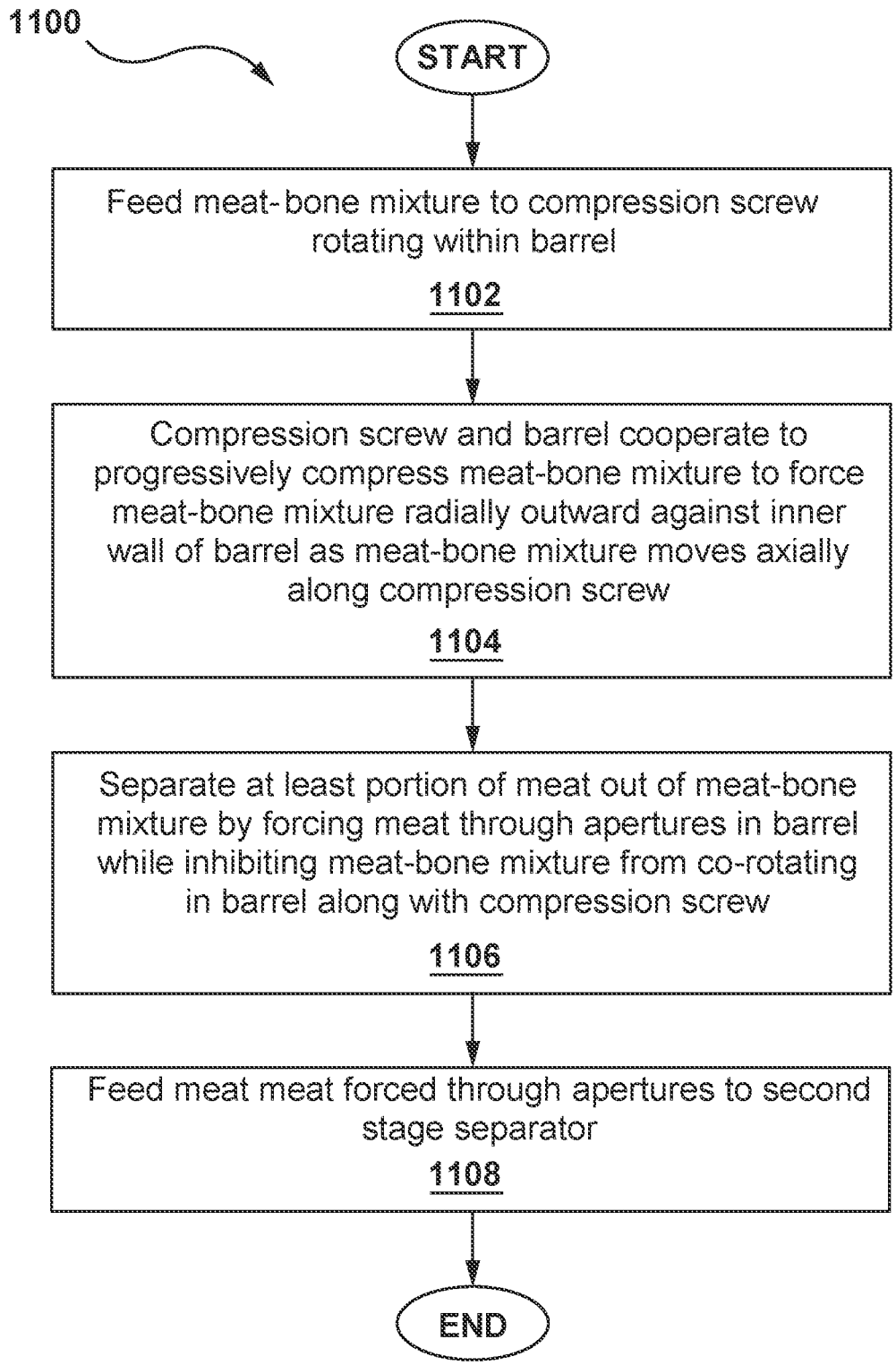
FIG. 11 is a flow chart showing an illustrative method for separating meat from bone.

Reference is now made to FIG. 11, which shows an illustrative method 1100 of separating meat from bone. At step 1102, meat-laden bones are fed to a compression screw rotating within a barrel. At step 1104, the compression screw and the barrel cooperate to progressively compress the meat-laden bones to force the meat-laden bones radially outward against an inner wall of the barrel as the meat-laden bones move axially along the compression screw. At step 1106, at least a portion of the meat is separated from the meat-laden bones by forcing the meat through apertures in the barrel while inhibiting the meat-laden bones from co-rotating in the barrel along with the compression screw, and then at step 1108 the meat that was forced through the apertures is fed to a second stage separator. In one embodiment, inhibiting the meat-laden bones from co-rotating in the barrel along with the compression screw is accomplished by cooperation of guide channels extending axially along an inner surface of the barrel with curved fillets extending between a root of the compression screw and screw flights of the compression screw. For example, the apparatus 100 described above may be used, although the method 1100 is not so limited.

Certain currently preferred embodiments have been described by way of example. It will be apparent to persons skilled in the art that a number of variations and modifications can be made without departing from the scope of the claims.

LIST OF REFERENCE NUMERALS

The following list of reference numerals is provided for convenience of reference, and no limitation is implied.

100 Apparatus generally
102 Compression screw
104 Screw assembly housing
106 Barrel
108 Inlet
110 Root of compression screw
112 Helical thread of compression screw
114 Infeed portion of compression screw
116 Compression portion of compression screw
118 Deboning portion of compression screw
120 Distal tip of compression screw
121 Screw piece forming infeed portion and compression portion of compression screw
122 Infeed screw flights of compression screw
123 Screw piece forming deboning portion of compression screw
124 Compression screw flights of compression screw 125 Keyed spline
126 Deboning screw flights of compression screw
127 Elongated bolt
128 Infeed channel volume
130 Compression channel volume
132 Deboning channel volume
134 Infeed fillets
136 Compression fillets
138 Deboning fillets
140 Screw assembly housing support
142 Motor housing
144 Motor
146 Drive member of motor
150 Infeed section of barrel
152 Compression section of barrel
154 Deboning section of barrel
156 Bone residue outlet section of barrel
158 Bone residue outlet
160 Terminus of bone residue outlet section (and of barrel)
162 Deboning screen
164 Meat apertures
166 Sizing bores of meat apertures
168 Interior surface of deboning section
170 Counterbores of meat apertures
172 Outer surface of deboning section
174 Chute
176 Inner surface of barrel at terminus thereof
178 Pressure cap
180 Axial bore in pressure cap
182 Annular gap between pressure cap and inner surface of barrel
184 Pressure cap actuator
186 Guide Channels
188 Interior surface of barrel (generally)
190 Merlons
192 Crenels
194 Inner surface of merlons
R Axis of rotation of compression screw within barrel
$\theta_{IN}$ Infeed lead angle on infeed screw flights
$\theta_{COM}$ Compression lead angle on compression screw flights
$\theta_{DEB}$ Deboning lead angle on deboning screw flights

What is claimed is:

1. An apparatus for separating meat from bone, comprising:
 a compression screw having a root and a helical thread extending along the root, wherein:
  the compression screw comprises an infeed portion, a compression portion and a deboning portion;
  a channel volume between screw flights of the thread is greater in the infeed portion and in the compression portion than in the deboning portion;
  the channel volume between the screw flights of the thread decreases from the infeed portion through the compression portion to the deboning portion; and
  curved fillets extend between the root and the screw flights;
 a screw assembly housing comprising:
 a barrel, the barrel comprising:
an infeed section;
 a compression section;
 a deboning section comprising at least one deboning screen formed by a plurality of meat apertures through the barrel, wherein the meat apertures are configured to permit passage of deboned meat therethrough; and
 a bone residue outlet;
 wherein:
  the compression section is disposed between the infeed section and the deboning section; and
  the bone residue outlet is in fluid communication with the deboning section;
  an inlet communicating with the infeed section of the barrel and adapted to feed meat-laden bones into the infeed section;
 wherein the compression screw is rotatably disposed within the barrel such that:
  the infeed portion of the compression screw is disposed in the infeed section of the barrel in registration with the inlet;
  the compression portion of the compression screw is disposed in the compression section of the barrel; and
  the deboning portion of the compression screw is disposed in the deboning section of the barrel in registration with the deboning screen;
 wherein:
  the barrel and the compression screw are configured to cooperate with one another to encourage axial movement of the meat-laden bones along the compression screw and the barrel and to inhibit the meat-laden bones from co-rotating within the barrel along with the compression screw at least within the deboning section of the barrel; and
  wherein the compression screw is connectable to at least one drive member for driving rotary movement of the compression screw within the barrel.

2. The apparatus of claim 1, wherein the compression screw is a single-flight screw.

3. The apparatus of claim 2, wherein:
 a plurality of circumferentially-spaced, longitudinally extending guide channels are formed in the interior surface of the barrel and extend at least through the deboning section of the barrel substantially parallel to an axis of rotation of the compression screw within the barrel; and
 the guide channels and the curved fillets cooperate with one another to encourage axial movement of the meat-laden bones along the compression screw and the barrel and to inhibit the meat-laden bones from co-rotating within the barrel along with the compression screw.

4. The apparatus of claim 3, wherein the guide channels are free of meat apertures.

5. The apparatus of claim 3, wherein:
 an inner surface of the barrel is inwardly crenellated at least through the deboning section to form alternating inwardly projecting merlons and crenels between the merlons wherein the crenels are recessed relative to the merlons;
 the meat apertures are formed in the merlons; and
 the guide channels are formed by the crenels.

6. The apparatus of claim 3, wherein the guide channels extend from the compression section into and through the deboning section.

7. The apparatus of claim 6, wherein the guide channels extend from the infeed section into and through the compression section and into and through the deboning section.

8. The apparatus of claim 3, wherein the bone residue outlet is formed at a terminus of a bone residue outlet section of the barrel extending from the deboning section opposite the compression section, wherein the terminus of the bone residue outlet section defines a terminus of the barrel.

9. The apparatus of claim 8, wherein the guide channels extend from the infeed section into and through the compression section, into and through the deboning section and into the bone residue outlet section.

10. The apparatus of claim 8, wherein:
the inner surface of the barrel is infundibular at the terminus of the bone residue outlet section;
a correspondingly infundibular pressure cap is received in the terminus of the bone residue outlet section;
a tip of the compression screw is received within a bore of the pressure cap; and
the bone residue outlet is formed by an annular gap between the pressure cap and the inner surface of the barrel.

11. The apparatus of claim 10, wherein the pressure cap is movable axially relative to the barrel and the compression screw to vary a volume of the annular gap.

12. The apparatus of claim 3, wherein:
a lead angle of the screw flights is greater in the infeed portion than in the deboning portion;
the lead angle decreases from the infeed portion through the compression portion to the deboning portion; and
the screw flights are closer together in the deboning portion than in the infeed portion and the compression portion.

13. The apparatus of claim 3, wherein the curved fillets extend along at least ten percent of a flight depth of the screw flights.

14. The apparatus of claim 13, wherein the curved fillets extend along at least fifteen percent of the flight depth of the screw flights.

15. The apparatus of claim 14, wherein the curved fillets extend along at least twenty percent of the flight depth of the screw flights.

16. The apparatus of claim 2, wherein the channel volume between screw flights is decreased from the infeed portion through the compression portion to the deboning portion by at least one of:
increasing a root diameter of the root of the compression screw;
decreasing a channel width between the screw flights; and
decreasing an inside diameter of the barrel.

17. The apparatus of claim 16, wherein the channel volume between screw flights is decreased from the infeed portion through the compression portion to the deboning portion by both increasing the root diameter of the compression screw and decreasing the channel width between the screw flights.

18. The apparatus of claim 1, wherein the apparatus is a first stage separator and is arranged to feed the deboned meat to a second stage separator.

* * * * *

UNITED STATES PATENT AND TRADEMARK OFFICE
CERTIFICATE OF CORRECTION

| | | |
|---|---|---|
| PATENT NO. | : 12,201,118 B2 | Page 1 of 1 |
| APPLICATION NO. | : 18/414381 | |
| DATED | : January 21, 2025 | |
| INVENTOR(S) | : Kenneth Benjamin Gulak et al. | |

It is certified that error appears in the above-identified patent and that said Letters Patent is hereby corrected as shown below:

In the Specification

Column 7, Line 6, please replace the word convexly curved with -- concavely curved --.

Column 7, Line 11, please replace the word convexly curved with -- concavely curved --.

Signed and Sealed this
Twenty-fifth Day of March, 2025

Coke Morgan Stewart
*Acting Director of the United States Patent and Trademark Office*